United States Patent [19]

Sasaki et al.

[11] Patent Number: 5,040,163
[45] Date of Patent: Aug. 13, 1991

[54] LASER BEAM CONTROL CIRCUIT FOR OPTICAL RECORDING/REPRODUCING APPARATUS

[75] Inventors: Yoshihiro Sasaki; Toru Sekiguchi, both of Tokyo, Japan

[73] Assignee: NEC Corporation, Japan

[21] Appl. No.: 472,856

[22] Filed: Jan. 31, 1990

[30] Foreign Application Priority Data

Feb. 1, 1989 [JP] Japan ................... 1-20856

[51] Int. Cl.$^5$ .................... G11B 11/12; G11B 7/125
[52] U.S. Cl. ..................... 369/116; 369/106; 369/121; 369/122; 369/54; 250/205
[58] Field of Search ............... 369/116, 111, 121, 122, 369/54, 32, 44.29, 44.25; 250/205, 201.5, 201.1; 322/31, 33; 328/151

[56] References Cited

U.S. PATENT DOCUMENTS 4,845,720 6/1989 Koishi et al. ............... 250/205

FOREIGN PATENT DOCUMENTS 62-89248 4/1987 Japan .

Primary Examiner—Roy N. Envall, Jr.
Assistant Examiner—Thang V. Tran
Attorney, Agent, or Firm—Ostrolenk, Faber, Gerb & Soffen

[57] ABSTRACT

A laser beam control circuit for an optical recording-/reproducing apparatus, which controls the intensity of a laser beam striking a magneto-optical disc. The control circuit controls the injection current to a laser diode to provide high intensity for recording and low intensity for reproducing, providing a smooth transition between the high and low intensity states, and avoiding any excessive transition current. The control circuit monitors the output power of the laser diode and maintains it at a first value in the reproducing mode and a second value in the recording mode, and further controls the output power so that even during switching, the output power does not exceed the second level. This is done by supplying a compensating reference voltage to the recording power control loop during the reproducing mode, so that the output of the recording error amplifier does not change abruptly when the operating mode is switched to the recording mode.

8 Claims, 3 Drawing Sheets

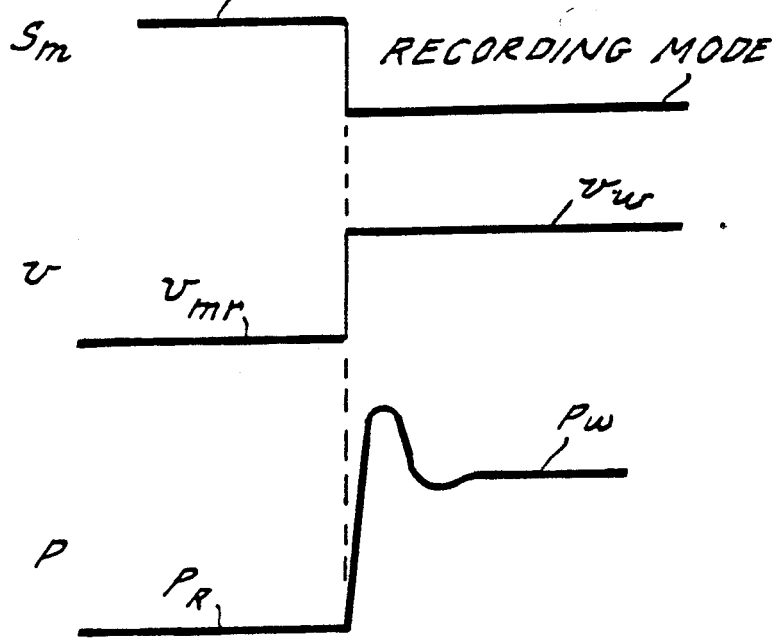
FIG. 3 - PRIOR ART
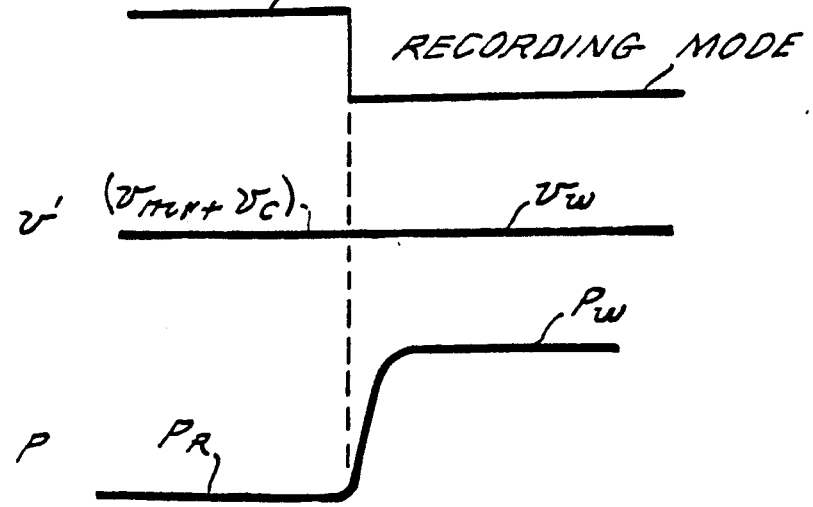
FIG. 4

LASER BEAM CONTROL CIRCUIT FOR OPTICAL RECORDING/REPRODUCING APPARATUS

BACKGROUND OF THE INVENTION

This invention relates to an optical recording/reproducing apparatus which performs recording/reproducing operations by irradiating a laser beam emitted from a semiconductor laser (laser diode) onto a magneto-optical disc, and particularly to a laser beam control circuit for an optical recording/reproducing apparatus, which controls the intensity of the laser beam intensity striking the magneto-optical disc.

In an optical recording/reproducing apparatus of this type, a high power laser beam is employed for a recording operation, and a low power laser beam is employed for a reproducing operation. These laser beams are generally generated by controlling an injection current to a laser diode. A prerequisite for such recording/reproducing operations is high-speed switching of the optical power (intensity) of the laser in order to carry out the switchover between the recording and reproducing operations. For this purpose, a laser beam control circuit is used to control the laser power by adjusting the injection current. The laser beam control circuit also functions to compensate for any intensity variation or fluctuation of the laser beam due to temperature changes.

In general, a laser beam control circuit of this type is provided with two drivers for a laser diode: a high power driver associated with a recording operation (an erasing operation may be included) and a low power driver associated with a reproducing operation. These drivers are controlled by means of respective automatic power control (APC) loops. Each of the APC loops comprises a photodiode to monitor the intensity of the laser beam emitted from the laser diode and a comparator to compare the output of the photodiode with a reference which is predetermined for each of the recording/reproducing operations. The comparison result is supplied to the driver for controlling the intensity of the laser beam so that output of the laser diode becomes the predetermined level. For example, a laser beam control circuit of this type is disclosed in Japanese Patent Laid-Open No. 62-89248.

However, in the conventional control circuit of this type, when the operation mode is switched from the reproducing operation to the recording operation, an excessive transition current flows through the laser diode due to a time-constant (an invariate factor) contained in the feedback loop, and, in particular, due to the delay of the follow-up of the power monitoring signal in comparison with the beam power switchover from the low power to the high power. Such excessive current at the start of the recording operation brings about various drawbacks; for example, the life time of the laser diode becomes shortened, and improper size pits are recorded on the optomagnetic disc at the start of the recording operation, thereby causing errors.

SUMMARY OF THE INVENTION

Accordingly, it is an object of the present invention to provide a laser beam control circuit for controlling a laser diode in an optical recording/reproducing apparatus, which is capable of preventing an excessive transition current and thus has no adverse effect on the life time of the laser diode.

Furthermore, it is another object of the present invention to provide a laser beam control circuit for an optical recording/reproducing apparatus, which is capable of preventing incorrect pit production on an optomagnetic disc when switchover to the recording operation from the reproducing operation has been carried out.

According to the present invention, there is provided a laser beam control circuit for an optical recording/reproducing apparatus, the laser beam control circuit comprising a monitor means for monitoring the output power of a laser diode, and a control means responsive to the monitored result for controlling the output power of the laser diode to maintain it at a first value and at a second value which are respectively associated with a reproducing mode and a recording mode, wherein the control means operates such that the output power of the laser diode is not transitionally increased beyond the second level when the operation of the apparatus is switched from the reproducing mode to the recording mode.

BRIEF DESCRIPTION OF THE DRAWINGS

FIG. 3 is a waveform diagram for explaining the operation of a prior art apparatus; and FIG. 4 is a waveform diagram for explaining the operation of the embodiment according to the present invention.

DESCRIPTION OF THE PREFERRED EMBODIMENT

Figure 1:
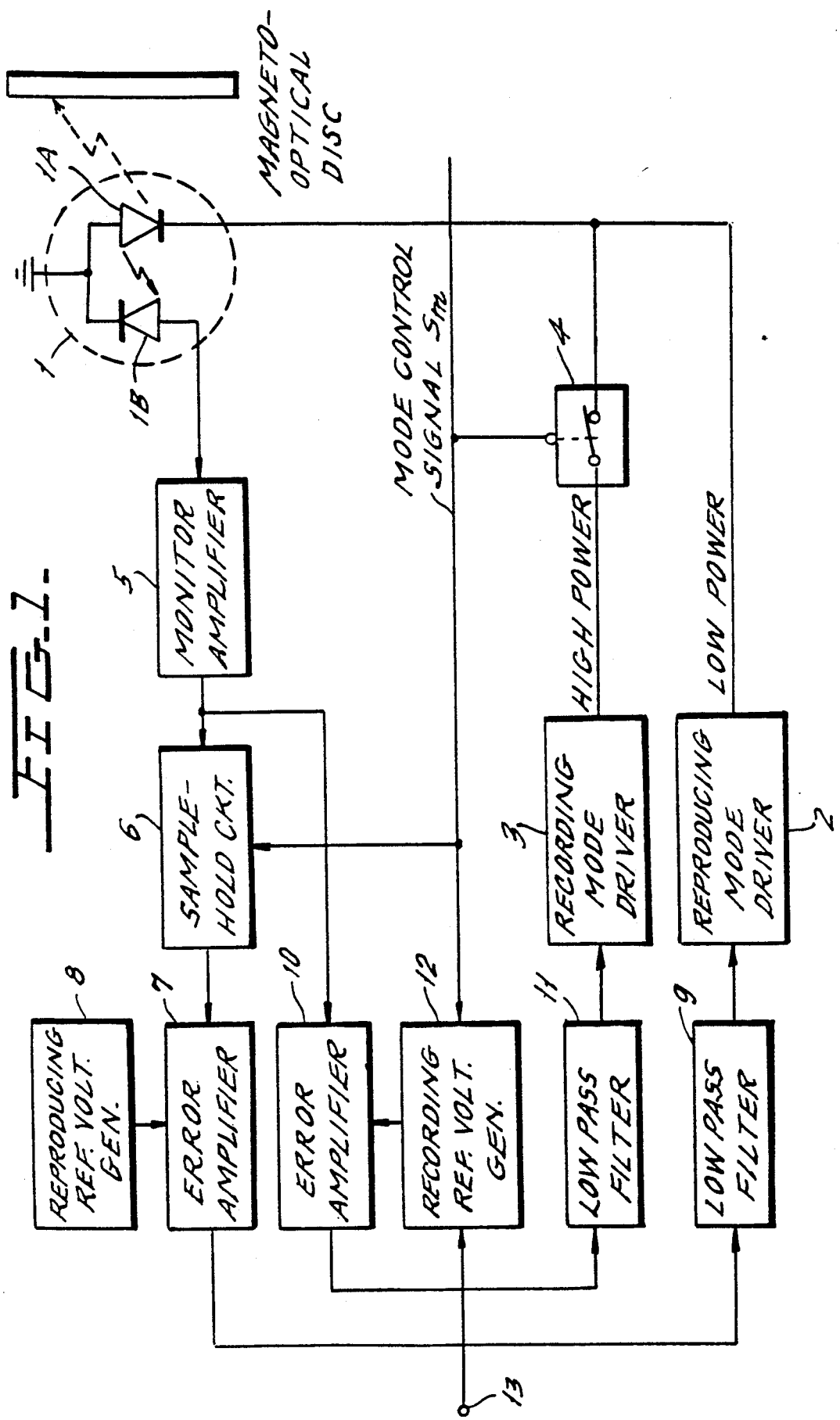
FIG. 1 is a block diagram of an embodiment of a control circuit according to the present invention.

FIG. 1 shows a laser beam control circuit for an optical recording/reproducing apparatus as an embodiment of the present invention. In FIG. 1, a semiconductor laser unit 1 comprises a laser diode 1A for emitting a laser beam and a monitor photodiode 1B for monitoring the intensity (power) of the laser beam. The laser diode 1A is driven by a reproducing driver 2 or by a recording driver 3. A switch 4 is placed between the recording driver 3 and the laser diode 1A and operated by a mode control signal Sm. In the recording mode, the switch 4 is closed to couple the recording driver 3 to the laser diode 1A which then produces a high power laser beam while in the reproducing mode only the reproducing driver 2 is coupled to the laser diode which then generates a low power laser beam. In either of the modes, the laser beam strikes the disc.

The laser beam control circuit further includes a monitor amplifier 5 to amplify the output of the monitor diode 1B, a sample-hold circuit 6, and an error amplifier 7 which produces a first difference signal (first error signal) between a reference voltage, corresponding to a reference laser beam intensity for the reproducing mode, and the output of the sample-hold circuit 6, corresponding to the actually emitted power. A reference voltage generator 8 is employed to generate the reference voltage for the reproducing mode. The output of the error amplifier 7 is supplied to the reproducing mode driver 2 via a low pass filter 9.

The monitor amplifier 5 also is coupled to another error amplifier 10 which generates a second error or difference signal between the output of the monitor amplifier 5 and a recording reference voltage which represents a reference laser beam intensity for the recording mode, and is supplied from a reference voltage generator 12. The difference signal from the error amplifier 10 is fed back to the recording mode driver 3 via a low pass filter 11. The reference voltage generator 12 basically generates the recording reference voltage in response to the mode control signal Sm. The mode control signal Sm is also sent to the sample-hold circuit 6 which is placed in its hold state during the recording mode. As a result, the APC operation for the reproducing mode is inhibited during the time of the recording mode. Further, the reference voltage generator 12 receives a pulse shaped modulation signal corresponding to information to be recorded, from a terminal 13.

Figure 2:
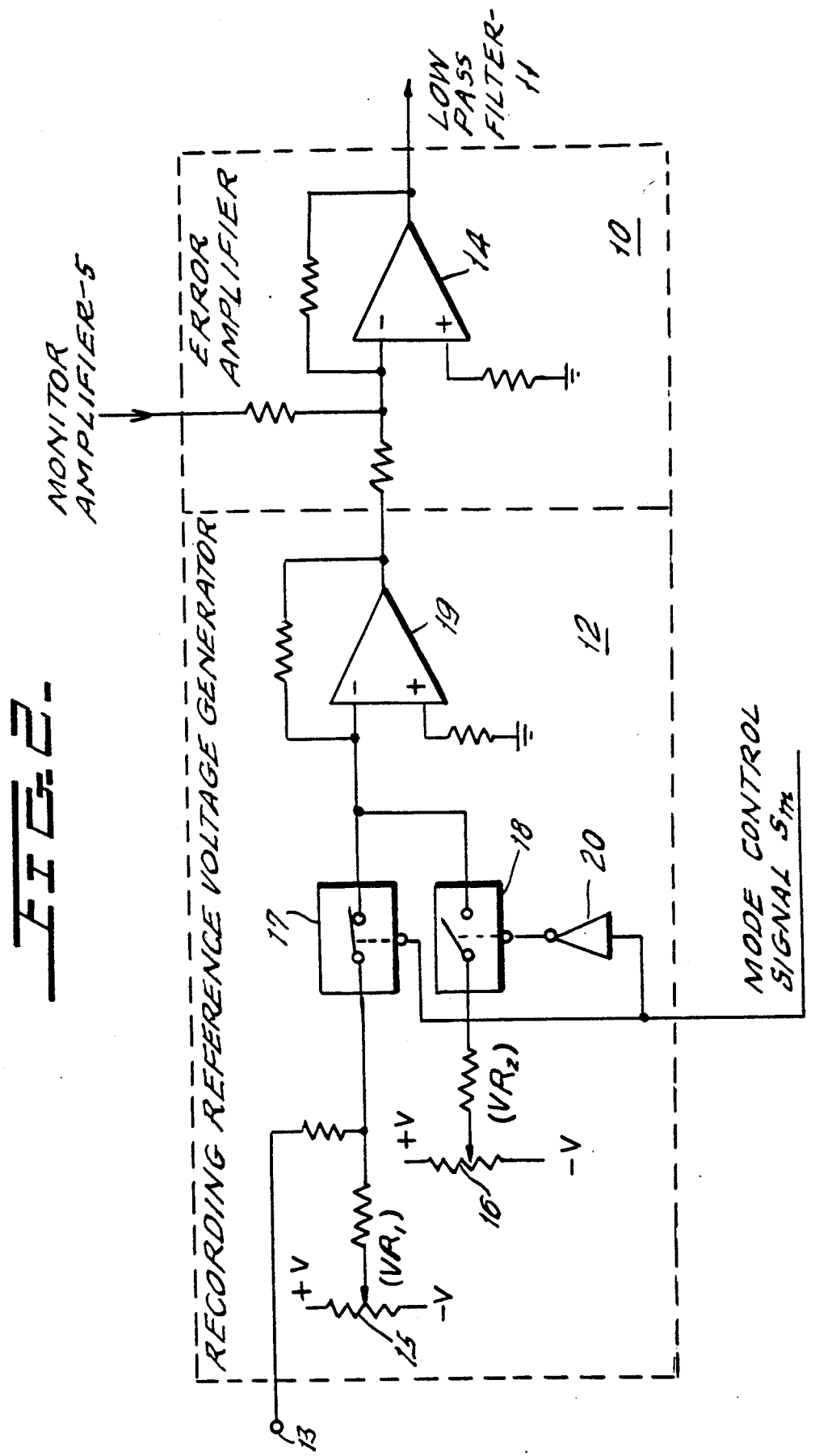
FIG. 2 is a detailed diagram illustrating the error amplifier and the reference voltage generator for the recording operation in FIG. 1.

Next, the error amplifier 10 and the reference voltage generator 12 will be described in detail, with reference to FIG. 2. The error amplifier 10 comprises an operational amplifier 14 and resistors as shown in FIG. 2, and receives the output of the monitor amplifier 5 (see FIG. 1) and the reference voltage from the reference voltage generator 12 at its inverting input. Thus, the operational amplifier 14 outputs an error signal so that the sum of the two inputs, i.e., the monitor amplifier 5 output and the reference voltage, stays at a constant level. In this case, the output from the monitor amplifier 5 is different in polarity from that of the reference voltage generator 12 and, thus, the error amplifier 10 performs a comparison operation therebetween.

The reference voltage generator 12 comprises: a potentiometer 15 for producing a voltage corresponding to the reference voltage $VR_1$ for the recording mode; a potentiometer 16 for producing a compensating reference voltage $VR_2$; switches 17 and 18 for complementarily switching the outputs of the potentiometers 15 and 16; an amplifier 19 receiving the reference voltage from either the potentiometer 15 or the potentiometer 16, depending on the setting of the switches 17 and 18; and an inverter 20 receiving the mode control signal Sm to control the switch 18. The output of the amplifier 19 is supplied to the inverting input of the error amplifier 10. Here, since the switches 17 and 18 are complementarily controlled in response to the mode control signal Sm, the switch 17 is closed and the switch 18 is opened in the recording mode. On the contrary, the switch 17 is opened and the switch 18 is closed in the reproducing mode. Thus, the present invention is characterized in that the potentiometer 16 produces the compensating reference voltage and this compensating reference voltage is applied to the error amplifier 10 during the time of the reproducing mode.

Now, the operation of the embodiment at the time of switchover from the reproducing mode to the recording mode will be described by comparing it with the operation of the prior art apparatus. In the reproducing mode, the laser diode 1A emits a laser beam of low power under the control of the combination of the error amplifier 7, the low pass filter 9 and the reproducing mode driver 2 in accordance with the reference voltage produced by the reference voltage generator 8 (see FIG. 1). The monitor amplifier 5 also delivers a low level corresponding to the low power of the emitted laser beam to the input of the error amplifier 10.

Starting in this state, in order to switch the operation into the recording mode, the switch 4 (FIG. 1) is closed and the reference voltage for the recording mode is applied to the error amplifier 10, and then the laser diode 1A is driven to output a high power laser beam by means of the recording mode driver 3.

In the prior art, there is no arrangement for supplying a compensating reference voltage during the reproducing mode in the recording reference voltage generator 12. In that case, upon switching from the reproducing to the recording mode, the input to the error amplifier 10 rises rapidly from a level corresponding to the output of the monitor amplifier 5 in the reproducing mode, to that level plus the reference voltage from the generator 12. Consequently, the second error signal from the amplifier 10 rapidly builds up transiently and, thus, the laser diode is strongly driven transitionally to generate excess laser power. This is because the output of the monitor amplifier 5, which is supplied to the error amplifier 10 to control the laser power, is delayed due to the time delay of the monitoring feed back loop including the monitor amplifier 5. FIG. 3 shows this operation. In this figure, when the mode control signal Sm is turned to the recording mode (low level), the input V of the error amplifier 10 is varied from the monitor amplifier output level Vmr associated with the reproducing mode to the level Vw associated with the recording mode. In this case, the output P of the laser diode 1A is transitionally varied as shown in FIG. 3. Such an excessive drive as described above shortens the life of the laser diode, and forms deteriorated recorded pits on a magneto-optical disc.

Contrary to this, in the embodiment of the present invention, the compensating reference voltage is applied to the input of the error amplifier 10 in the reproducing mode. That is, an input V′ at the input of the operational amplifier 14 becomes (Vmr+Vc) which is the sum of the low monitor 5 output level Vmr associated with the reproducing mode, and the compensating reference voltage Vc. That is, the compensating voltage is set such that the sum of the compensating voltage and the reproducing mode monitor voltage, is substantially equal to the sum of the recording reference voltage and the recording mode monitor voltage. Accordingly, if this sum is made substantially equal to a level Vw corresponding to the sum of the recording reference voltage and the monitor output level in the recording mode, no transitional response in the laser diode occurs. Therefore, the life of the laser diode is not shortened, and also, the deteriorated recorded pits are not produced on the optomagnetic disc.

FIG. 4 shows this operation. Since there occurs no variation at the input of the operational amplifier 14 when the operating mode is switched from the reproducing mode to the recording mode, the output of the laser diode advantageously rises from output $P_R$ associated with the reproducing mode to the output Pw associated with the recording mode.

As described above, the laser beam control circuit of the invention is provided with an arrangement for supplying a compensating reference voltage during the reproducing mode to the recording APC loop so that the output of the error amplifier does not vary when the operating mode is switched to the recording mode. Accordingly, deterioration of the laser diode can be prevented, and formation of deteriorated recorded pits on the magneto-optical disc can also be avoided.

What is claimed is:

1. A control circuit for controlling the power of a light beam emitted from a laser diode, which is incorporated in an optical recording/reproducing apparatus, said control circuit comprising:

first driver means for driving said laser diode to emit a light beam at a first power level which is suitable for reading out information from a magneto-optical medium in a reproducing mode;

second driver means for driving said laser diode to emit a light beam at a second power level higher than said first power level which is suitable for writing information onto a magneto-optical medium in a recording mode;

detector means for detecting the power level of the light beam emitted from said laser diode and for outputting a detection signal corresponding to the output light beam power;

first control means for controlling said first driver means in accordance with the output of said detector means to maintain the output power of said laser diode at said first power level in the reproducing mode; and second control means for controlling said second driver means in accordance with the output of said detector means to maintain the output power of said laser diode at said second power level in the recording mode, wherein said second control means includes:

reference voltage generator means for generating a reference voltage corresponding to said second power level;

compensating voltage generator means for generating a compensating voltage;

selector means for alternatively selecting said compensating voltage in the reproducing mode and said reference voltage in the recording mode; and comparator means for comparing the selected output of said selector means with the output of said detector means and supplying a control signal to control said second driver means according to the result of the comparison, wherein said compensating voltage is set such that the output control signal of said comparator means is substantially kept equal in the reproducing mode and the recording mode.

2. A control circuit for controlling the power of a light beam emitted from a laser diode, which is incorporated in an optical recording/reproducing apparatus, said control circuit comprising:

monitor means for monitoring the intensity of the laser beam emitted from said laser diode; and control means responsive to the output of said monitor means for controlling said laser beam power to maintain it at a first level in a reproducing mode and at a second level in a recording mode, wherein said control means operates such that said laser beam power from said laser diode does not transitionally increase substantially beyond said second level when said control means is switched from said reproducing mode to said recording mode;

said control means further comprising:

a first control circuit for controlling said laser beam power in said reproducing mode;

a second control circuit for controlling said laser beam power in said recording mode; and selector means for selecting said first or second control circuit in response to a mode control signal, wherein said second control circuit includes:

reference voltage generator means for generating a reference voltage according to said second level in said recording mode;

comparator means for comparing the output of said monitor means with said reference voltage and driving said laser diode according to the comparison result; and compensator means for fixing said comparison result at a fixed voltage in said reproducing mode, said fixed voltage corresponding to the output of said comparator in said recording mode.

3. A control circuit as claimed in claim 2, said compensator means including:

compensating voltage generating means for generating a compensating voltage, said compensating voltage being applied to said comparator means in said reproducing mode.

4. A control circuit as claimed in claim 3, wherein said compensating voltage is set such that the sum of said compensating voltage and the output of said monitor means in said reproducing mode is substantially equal to the sum of said reference voltage and the output of said monitor means in said recording mode.

5. A control circuit as claimed in claim 1, said second control means further comprising:

low pass filter means receiving the output of said comparator means for delivering a filtered output to said second driver means.

6. A control circuit as claimed in claim 2, wherein said second control circuit further includes:

low pass filter means receiving said comparison result from said comparator means for delivering a filtered comparison result and driving said laser diode according to the filtered comparison result.

7. A control as claimed in claim 5, wherein said second control means operates as a closed-loop control means in said recording mode.

8. A control circuit as claimed in claim 6, wherein said second control circuit operates as a closed-loop control circuit in said recording mode.

* * * * *